United States Patent [19]
Lewis et al.

[11] Patent Number: 6,146,730
[45] Date of Patent: Nov. 14, 2000

[54] CORROSION INHIBITING SPACERS

[75] Inventors: David L. Lewis, Woodbury, Conn.; Jeffrey A. Berzack, Sterling Heights, Mich.

[73] Assignee: Polar Industries, Inc., Prospect, Conn.

[21] Appl. No.: 09/082,772

[22] Filed: May 21, 1998

[51] Int. Cl.⁷ ...................................................... B32B 3/10
[52] U.S. Cl. ............................... 428/43; 428/80; 428/99; 428/131; 425/472
[58] Field of Search ............................... 428/80, 99, 131, 428/43; 425/472, 589; 252/387

[56] References Cited

U.S. PATENT DOCUMENTS

| | | |
|---|---|---|
| 3,525,783 | 8/1970 | Prikkel, III . |
| 4,629,650 | 12/1986 | Kataoka . |
| 4,973,448 | 11/1990 | Carlson . |
| 5,139,700 | 8/1992 | Miksic . |
| 5,209,869 | 5/1993 | Miksic et al. . |
| 5,332,525 | 7/1994 | Miksic et al. . |
| 5,344,589 | 9/1994 | Miksic et al. . |
| 5,422,187 | 6/1995 | Miksic et al. . |
| 5,593,624 | 1/1997 | Lewis . |

*Primary Examiner*—Alexander Thomas
*Attorney, Agent, or Firm*—Ware Fressola Van Der Sluys & Adolphson LLP

[57] ABSTRACT

A porous spacer incorporates a vaporizable corrosion inhibitor. The spacer is designed to be placed on a leader pin between the members of a mold or die set. The spacer is compressed between the members when the latter are stored. The spacer releases the inhibitor, which prevents corrosion during the storage period. The spacer serves to maintain a vapor flow space between the members.

14 Claims, 2 Drawing Sheets

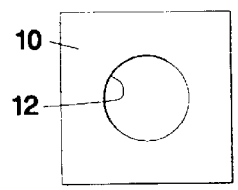 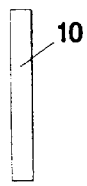 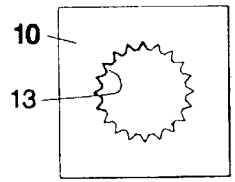
FIG. 3   FIG. 4   FIG. 5
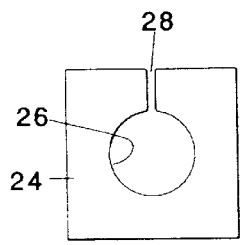 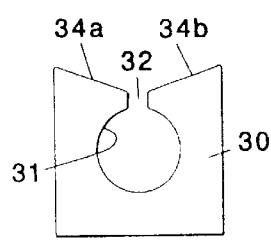 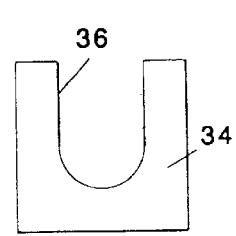
FIG. 6   FIG. 7   FIG. 8
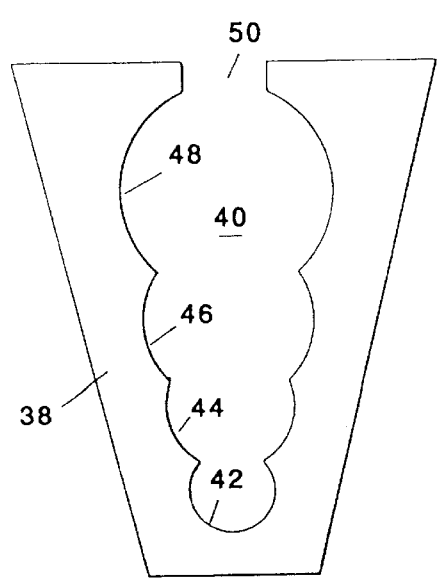 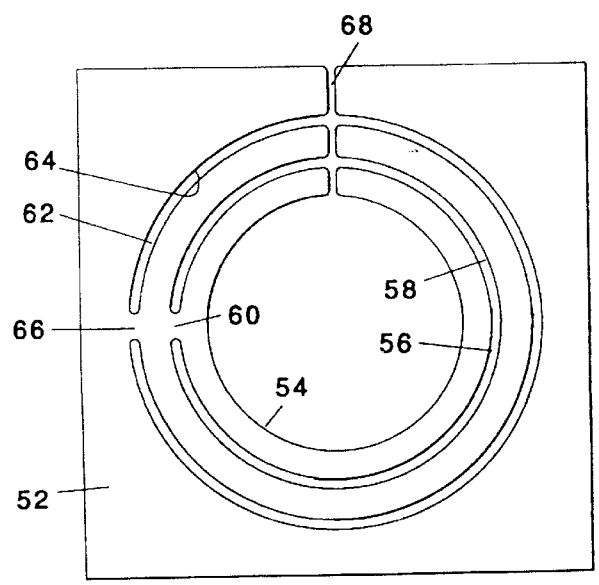
FIG. 9   FIG. 10

CORROSION INHIBITING SPACERS

BACKGROUND OF THE INVENTION

1. Technical Field

This invention is in the field of corrosion protection. More particularly, it relates to a product for inhibiting corrosion of metallic surfaces during periods of storage.

2. Description of the Prior Art

It is known to make a molded product which has incorporated therein a vapor phase corrosion inhibitor. See, for example, U.S. Pat. No. 5,593,624 of Lewis. Lewis discloses a method of making such products incorporating, for example, various compositions described in the Lewis patent including compositions available from Cortec Corporation of St. Paul, Minn. The disclosure of the Lewis patent is incorporated herein by reference. It discloses the construction of beaded foam blocks, custom molded foams, and planks, all of which have the corrosion inhibitor incorporated therein. These products may be used, inter alia, to manufacture containers and for building construction elements to protect metallic surfaces from corrosion.

One problem which is endemic to manufacturers utilizing molds and die sets is the surface corrosion and rusting which ensues during storage. This rust must be carefully removed, a costly and time-wasting process, before the mold or die can be used. In order to eliminate this problem, mold preservatives which may be silicone or oil-based may be employed. Although this may eliminate or minimize rusting, the preservative itself requires removal before usage. Accordingly, it is a primary object of the present invention to provide a means for eliminating corrosion of molds, die sets and the like during periods of storage. Other objects, features, and advantages will become apparent from the following description and appended claims.

SUMMARY OF THE INVENTION

The invention comprises a porous slab-like spacer which is impregnated with a vaporizable corrosion inhibitor. The spacer may be formed from any porous or absorbent material such as, for example, polymeric foam, felt, or cardboard. It defines an opening therethrough which fits over one of the leader pins which extend from one member of the die or mold set into holes in the other member of the set. In a preferred embodiment, compressive force is exerted between the two members of the set so as to partially crush the spacers to aid in the release of the corrosion inhibiting vapor. The crushed spacers serve to maintain a preselected vapor flow space between the two die members, thereby allowing the vapor access to the metal surfaces.

BRIEF DESCRIPTION OF DRAWINGS

FIG. 3 is an elevational view of a spacer in accordance with this invention;

FIG. 4 is a right side view of the spacer of FIG. 3 and also represents the right side view of the spacers of FIGS. 5–9;

FIG. 5 is a modified version of the spacer of FIGS. 3 and 4;

FIG. 6 is a view similar to FIG. 3, illustrating a modified spacer in accordance with the invention;

FIG. 7 is a view similar to FIG. 3, illustrating a further modification of the invention;

FIG. 8 is a view similar to FIG. 3, illustrating a further modification of the invention;

FIG. 9 is a view similar to FIG. 3, illustrating a further modification of the invention; and FIG. 10 is a view similar to FIG. 3, illustrating a still further modification of the invention.

BEST MODE FOR CARRYING OUT THE INVENTION

As used herein the terms "mold" or "die sets" are to be construed to include any two elements which are arranged to be stored together with pins or rods therebetween and wherein at least one of said elements includes a metallic surface to be protected from corrosion. The term "leader pins" is to be construed as including any elements protruding from one of the members and received in openings in the other member, without regard to its cross-sectional configuration.

Turning now to FIG. 3, there is illustrated a spacer in the form of a slab-like body 10. The body 10 may be formed by the method disclosed in the above-referenced Lewis patent and is a formed from a porous material, such as foamed plastic, impregnated with a vaporizable solid or liquid corrosion inhibitor. It defines an opening 12. The body 10 may be of any desired thickness, for example, 0.25 inch in one actual embodiment. The opening 12 has a diameter very slightly larger than that of a standard leader pin. Conventional standard leader pins are usually cylindrical and may have diameters of ¾ inch, ⅞ inch, 1 inch, 1¼ inches, 1½ inches, 2 inches, 2½ inches, and 3 inches. A similar range of sizes is available in metric units.

Figure 1:
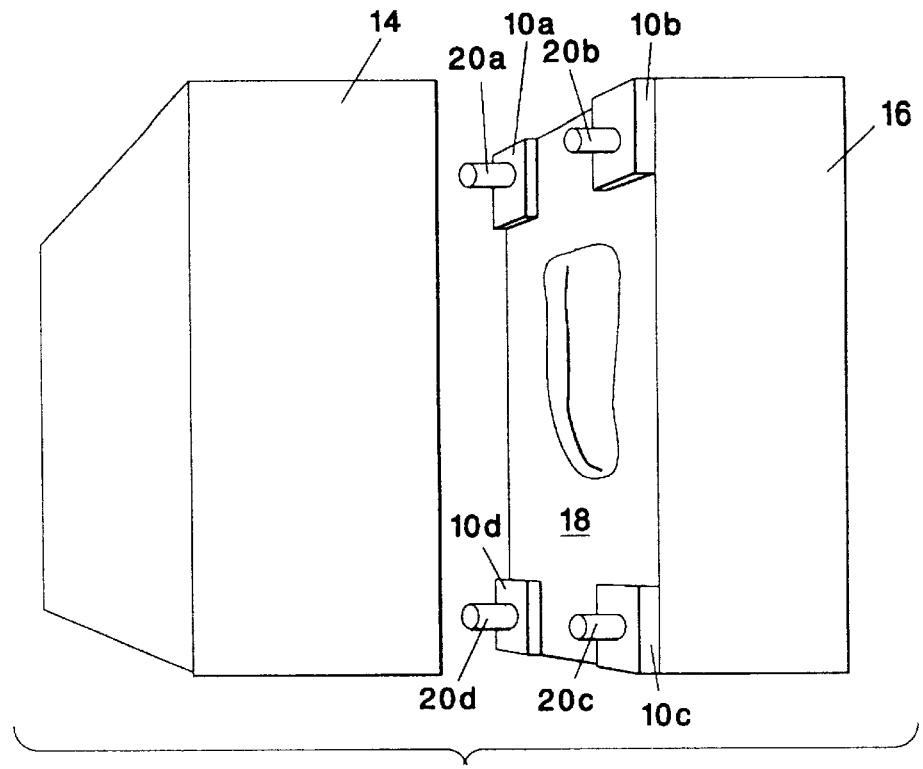
FIG. 1 illustrates schematically two members of a mold or die set having spacers mounted on the leader pins
Figure 2:
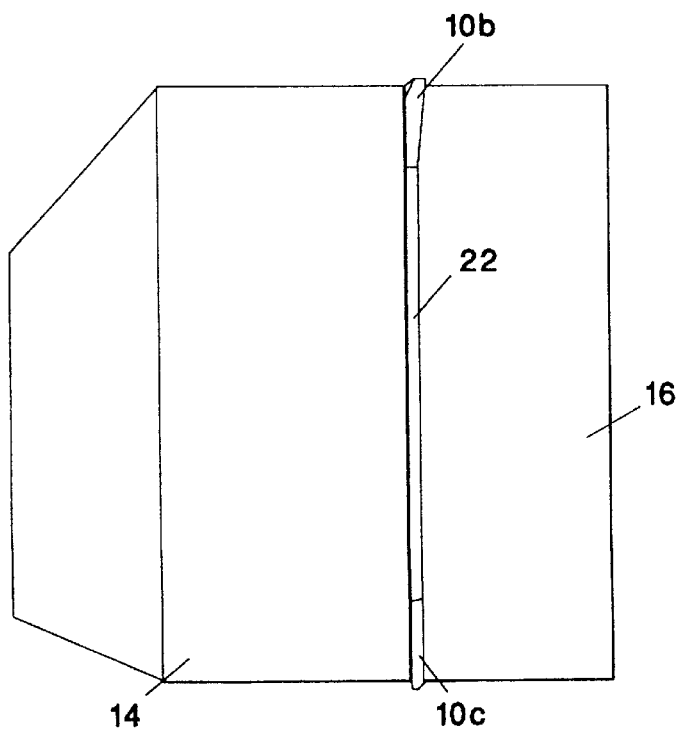
FIG. 2 is a view similar to FIG. 1 but showing the two members of the set connected together for storage purposes.

FIG. 1 illustrates a first die member 14 and a second die member 16. A surface 18 of the second die member 16 faces the first die member 14 and four leader pins 20a–d are carried at its corners. Mounted upon each of these leader pins is a spacer body 10a–d as illustrated in FIG. 3. For purposes of storage, die members 14, 16 are pressed together as illustrated in FIG. 2, thereby partially crushing the spacer bodies 10a–d. The crushed bodies, however, maintain a vapor flow space 22. Further, the crushed bodies 10a–d may be made to extend to, or beyond, the perimeter of the surface 18 to provide positive verification that the subject molds or dies have been protected.

The spacers of this invention may take a variety of shapes as illustrated in FIGS. 5–10. FIG. 5, for example, illustrates a spacer substantially similar to that of FIG. 3 but having a serrated central opening 13. The internal diameter of the opening formed by the serrations may be slightly smaller than the leader pin diameter, allowing for a snug compression fit.

FIG. 6 illustrates a spacer having a body 24, an opening 26, and a slot 28 which extends into the opening from one edge of the body 24. The normal resilience of the body 24 causes the slot 28 to expand when mounted on the leader pin.

FIG. 7 illustrates a modification wherein the body 30 also defines a circular opening 31 and a slot 32. In this modification, however, the slot 32 terminates at a pair of angled shoulders 34a, 34b. This construction permits the spacer to be snapped onto the leader pin from the side.

FIG. 8 illustrates a spacer having a body 34 with a U-shaped opening 36. In effect, the slot is widened to the diameter of the opening. This spacer may be slid directly onto a leader pin.

FIG. 9 defines a modification of a spacer which may be employed with a plurality of leader pins, in this case four. Its body 38 is illustrated as trapezoidal, although this is not a necessary configuration. It has an opening 40 which is formed by arc segments of overlapping successively larger, circles 42, 44, 46, 48. The opening 40 is connected by a slot 50 to one edge of the body 38. The slot 50, however, is not a required element and could be omitted.

A further modification and a preferred form of the invention is illustrated in FIG. 10. A body 52 defines a central opening 54. The diameter of the opening 54 conforms to, or is slightly larger than, the diameter of a conventional leader pin. Spaced concentrically around opening 54 is a substantially circular slot 56. The outer circumference 58 of slot 56 conforms to, or is slightly larger than, the diameter of a larger leader pin. The slot 56 does not form a complete circle but leaves a narrow neck 60. Surrounding, and substantially concentric with, the slot 56 is a larger slot 62. The outer circumference 64 of slot 62 conforms to, or is slightly larger than, the outer diameter of a still larger leader pin. Slot 62, like slot 56, is slightly less than completely circular, leaving a neck 66. A slot 68 extends from one edge of the body 52 and into the opening 54.

The embodiment of FIG. 10 is useful because the user may adapt it to fit a plurality of leader pin sizes, in this case three. It may be used as is, with the opening 54 engaging the leader pin. However, the segments between the opening 54 and the slots 56, 62 may be successively broken away at the necks 60, 66 to form successively larger openings to fit larger leader pins.

It is believed that the many advantages of this invention will now become apparent to those skilled in the art. It will also be apparent that a number of variations and modifications may be made therein without departing from its spirit and scope. Accordingly, this description is to be construed as illustrative only, rather than limiting. This invention is limited only by the scope of the following claims.

What is claimed is:

1. Apparatus for protecting metallic surfaces of first and second die members interconnected for storage by at least one leader pin which comprises:

at least one porous spacer mounted on said leader pin between said first and second die members, said spacer being impregnated with a vaporizable corrosion inhibitor.

2. The apparatus of claim 1 wherein said spacer maintains a vapor flow space between said first and second die members.

3. The apparatus of claim 2 wherein said spacer is visible.

4. The apparatus of claim 2 wherein said spacer is partially crushed between said first and second die members.

5. Apparatus for protecting metallic surfaces of first and second die members interconnected for storage by at least one leader pin which comprises:

at least one porous spacer body telescopingly mounted on said leader pin between said first and second die members, said spacer body being impregnated with a vaporizable corrosion inhibitor, said body having at least one edge and means defining an opening positioned near said edge to receive and embrace said leader pin.

6. The apparatus of claim 5 wherein said body defines a slot extending from said edge to said opening.

7. The apparatus of claim 6 wherein said edge comprises angled shoulders adjacent said slot.

8. The apparatus of claim 6 wherein said slot has a width substantially equal to the diameter of said opening thereby forming a U-shaped opening and slot combined.

9. The apparatus of claim 5 wherein said opening is slightly oversized relative to said one leader pin so as to freely engage said leader pin.

10. The apparatus of claim 5 wherein said spacer is partially crushable between said first and second die members to aid in the release of corrosion inhibitor vapor.

11. The apparatus of claim 5 wherein said opening conforms substantially to the size and configuration of a standard leader pin and said body further defines at least one breakaway portion surrounding said opening, whereby removal of said breakaway portion provides a second opening conforming substantially to the size and configuration of a larger standard leader pin.

12. The apparatus of claim 11 wherein said body defines a plurality of substantially concentric breakaway portions successively removable to define successively larger openings conforming to the size and configurations of larger standard leader pins.

13. The apparatus of claim 5 wherein said opening is substantially V-shaped and has a margin describing a plurality of arc segments of overlapping, successively larger, circles conforming substantially to the size and configurations of standard leader pins.

14. The apparatus of claim 5 wherein said opening is serrated and has a diameter slightly smaller than a standard leader pin to provide a frictional compression fit.

\* \* \* \* \*

UNITED STATES PATENT AND TRADEMARK OFFICE
CERTIFICATE OF CORRECTION

PATENT NO.    : 6,146,730
DATED         : November 14, 2000
INVENTOR(S)   : David L. Lewis and Jeffrey A. Berzack Page 1 of 1

It is certified that error appears in the above-identified patent and that said Letters Patent is hereby corrected as shown below:

<u>Column 1,</u>
Line 54, after "pins" -- ; -- should be inserted.

Signed and Sealed this

Fourth Day of November, 2003

JAMES E. ROGAN
*Director of the United States Patent and Trademark Office*